United States Patent [19]

Li

[11] 4,259,189
[45] Mar. 31, 1981

[54] NOVEL LIQUID MEMBRANE FORMULATIONS

[75] Inventor: Norman N. Li, Edison, N.J.

[73] Assignee: Exxon Research and Engineering Co., Florham Park, N.J.

[21] Appl. No.: 870,806

[22] Filed: Jan. 19, 1978

[51] Int. Cl.³ .................. B01D 39/00; B01D 13/00
[52] U.S. Cl. .................. 260/29.6 AN; 210/643; 210/500.2; 252/358
[58] Field of Search .................. 210/21, 22, 500 M; 260/326.5 FM; 252/DIG. 10, DIG. 14, DIG. 1, 358, 357, 542, 303

[56] References Cited

U.S. PATENT DOCUMENTS 3,004,923  10/1961  Jursleh .................. 252/358 X
3,629,119  12/1971  Weaver .................. 252/357 X

OTHER PUBLICATIONS

Mohan et al., "Nitrate and Nitrite Reduction by Liquid Membrane-Encapsulated Whole Cells", from *Biotechnology and Bioengineering*, vol. XVII, pp. 1137–1156, 1975, p. 1140.

*Primary Examiner*—Frank A. Spear, Jr.
*Attorney, Agent, or Firm*—Edward M. Corcoran

[57] ABSTRACT

This invention relates to emulsions containing a polyamine derivative as the sole surfactant and strengthening agent. The emulsions comprise an aqueous interior phase surrounded by an oily exterior phase which contains a polyamine derivative having the general formula:

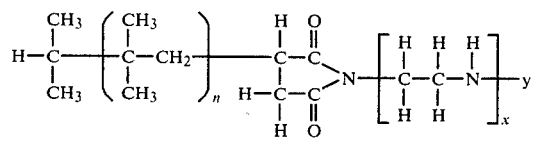

wherein n for the polyisobutylene portion varies from 10 to 60, x varies from 3 to 10, and y is selected from the group consisting of hydrogen, hydrogen-containing nitrogen radicals, hydrogen and oxygen-containing nitrogen radicals, and alkyl radicals having up to 10 carbons, alkyl radicals having up to 10 carbons which contain nitrogen, oxygen or both, and mixtures of said polyamine derivatives.

6 Claims, No Drawings

NOVEL LIQUID MEMBRANE FORMULATIONS

DESCRIPTION OF THE INVENTION

The instant invention relates to novel liquid membrane formulations, i.e. emulsions that are stable between the temperatures of about −20° C. up to and not including the boiling point of the interior phase of the emulsion but not greater than about 120° C. The emulsions comprise a water-immiscible exterior phase surrounding an interior phase that is immiscible with said exterior phase. The exterior phase comprises an oil component, and an additive which acts both as a surfactant and as a membrane-strengthening agent. They are selected from the group consisting of a polyamine derivative having the general formula

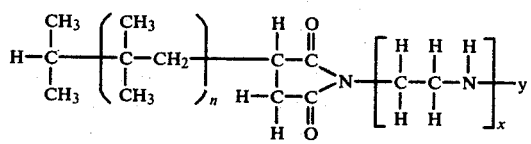

wherein n for the polyisobutylene portion varies from 10 to 60, x varies from 3 to 10, and y is selected from the group consisting of hydrogen, hydrogen-containing nitrogen radicals, hydrogen and oxygen-containing nitrogen radicals, and alkyl radicals having up to 10 carbons, alkyl radicals having up to 10 carbons which contain nitrogen, oxygen or both, and mixtures of said polyamine derivatives;

a polyisobutylene succinic anhydride derivative selected from the group consisting of compounds of the structure

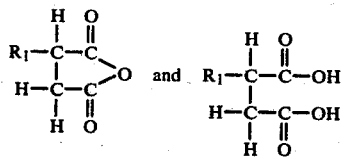

wherein $R_1$ is a $C_{10}$–$C_{60}$ hydrocarbon; thioacids of the structure

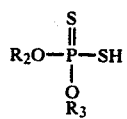

wherein $R_2$ and $R_3$ are independently selected from the group consisting of $C_4$–$C_{10}$ straight chain alkyl, $C_4$–$C_{10}$ branched chain alkyl, $C_4$–$C_{10}$ straight chain alkyl phenol, and $C_4$–$C_{10}$ branched chain alkyl phenol; and compounds of the structure

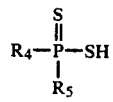

wherein $R_4$ and $R_5$ are independently selected from the group consisting of hydrogen, $C_4$–$C_{10}$ straight chain alkyl, $C_4$–$C_{10}$ branched chain alkyl, $C_4$–$C_{10}$ straight chain alkyl phenol, and $C_4$–$C_{10}$ branched chain alkyl phenol.

The last type of additive, the compounds of the structure

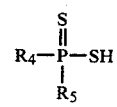

is a copolymer of decyl methacrylate, hexadecyl methacrylate and vinyl pyridine of varying proportions. It may have a molecular weight ranging from about 5,000 to 100,000 and a percent nitrogen content ranging from 0.5 to 2.

These emulsion formulations are useful wherever a stable water-in-oil type emulsion is needed, especially at high temperatures. For example, the liquid membrane formulations of the instant invention are useful in removing compositions dissolved in the aqueous feed phase, i.e. the outer phase, by trapping them in the interior phase of the emulsion. In this trap embodiment, the exterior phase is permeable to said dissolved compositions and the interior phase comprises a reagent capable of converting said dissolved composition into a nonpermeable form. In another embodiment, the liquid membrane formulations of the instant invention may be used as slow-release mechanisms. In this embodiment, the interior phase comprises the composition to be released from the emulsion. The compositions utilized in the slow-release embodiment are only slightly soluble in the exterior phase of the emulsion whereby said composition permeates through said exterior phase into the aqueous outer phase over a period of time. When the emulsions of the instant invention are used, there is no need to cool down the feed phase before adding the emulsion, which was often necessary with the emulsion formulations of the prior art.

SUMMARY OF THE PRIOR ART

In a great number of its intended uses, the stability of the liquid membrane is an extremely important property. This property is most important when the emulsion is used to isolate the feed phase from the contents of the interior phase of the emulsion—breakdown of the emulsion would destroy this isolation property.

Those in the liquid membrane art have recognized the importance of an emulsion's stability and have responded by developing many additives that are capable of enhancing an emulsion's stability. These additives are of two distinct types—surfactants and strengthening agents. Examples of surfactants are given in U.S. Pat. No. 3,779,907. Specific strengthening agents can be found in U.S. Pat. No. 4,183,918.

Although both strengthening agents and surfactants increase an emulsion's stability, they do not perform identical functions. The surfactant essentially forms a film at the interface between the "oil" and "aqueous" phase, i.e. at both the interface, between the aqueous feed phase and the oil phase and the interface between the oil phase and aqueous interior phase of the emulsion, thereby increasing the stability of the liquid membrane formulation. The strengthening agent does not merely strengthen the interface between different phases but strengthens the oil phase, i.e. the membrane itself. This effect can be achieved by the following methods, either singly or in combination: increasing the viscosity of the membrane phase or by chemical interaction with the surfactant layers at the two interfaces described above. The applicant wishes to note that he does not intend to limit his invention to any particular theories disclosed herein. Any theory presented in this application is presented solely for illustrative purposes—so that one may better understand the invention.

In order to achieve both types of stability, i.e. the stability of the oil membrane phase itself and the interface stability, it was necessary to add separate strengthening agent and surfactant components to the emulsion's exterior phase. This, however, complicates the emulsion formation procedure since the person formulating the emulsion must carefully blend several components in specific amounts to make an operable emulsion for his desired process. Further, certain surfactants and strengthening agents are either completely incompatible, i.e. interact so as to reduce each other's useful qualities, or incompatible under certain conditions, e.g. temperature, concentrations, etc.

The employment of one additive which functions as both a surfactant and a strengthening agent erases all the above formulation problems.

In addition to all the advantages inherent in the utilization of one component to perform the function of two, other advantages were discovered. It was discovered that water-in-oil emulsions utilizing any of the additives specified above, within the limitations and conditions disclosed below, remained unexpectedly stable under high temperature conditions (e.g. over 100° C.).

Emulsion formulations of the prior art rarely remain stable above 85° C., whereas the emulsion formulations of the instant invention may remain stable up to temperatures as high as 120° C.

The article *Nitrate and Nitrite Reduction by Liquid Membrane-Encapsulated Whole Cells,* by Raam R. Mohan and Norman N. Li, Biotechnology and Bioengineering, Volume XVII, pp 1137–1156, 1975, discloses at page 1140 that ENJ-3029 is a polyamine which acts as both a strengthening agent and a surfactant.

The article does not reveal, however, that the ingredients of ENJ-3029 responsible for this behavior belong to the group of polyamine derivatives having the general formula:

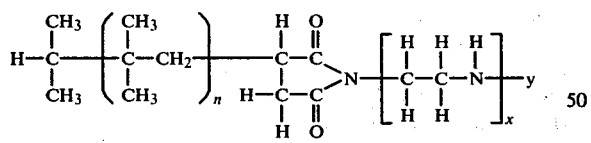

wherein n varies from 10 to 60, x varies from 3 to 10, and y is a combination of basically two groups, one being an oxygen-containing hydrocarbon radical having up to 10 carbons and the other being a nitrogen-containing hydrocarbon radical having up to 10 carbons.

The article only reveals the dual capacity of ENJ-3029, without specifying its composition, in passing and does not give a single example of using ENJ-3029 as the sole surfactant and strengthening agent component.

The article specifically mentions the dual capacity of ENJ-3029 at page 1140, where it lists the components of a particular oil phase used in the disclosed research. The list includes 2% of the surfactant, Span-80, as well as the 10% ENJ-3029. Therefore, even though the authors mention the potential dual capacity of ENJ-3029, they do not use it as the sole surfactant and strengthening agent even in the example in which they reveal this information. They used ENJ-3029 in conjunction with another surfactant.

Further, the article does not teach either the minimum or maximum amounts of ENJ-3029 that can be used to exhibit this dual capacity. Also the article does not reveal any other conditional limitations or the unexpected stability characteristics of these formulations, e.g. the high temperature stability of an emulsion that utilizes the proper amount of ENJ-3029. In fact, the article does not disclose any emulsion being used at a temperature over 33° C., much less an emulsion using ENJ-3029 as the sole surfactant and strengthening agent at temperatures up to 120° C.

DETAILED DESCRIPTION OF THE INVENTION

It has now been unexpectedly discovered that water-in-oil emulsions, wherein the exterior phase comprises an oil component and an additive selected from the group consisting of a polyamine derivative having the general formula

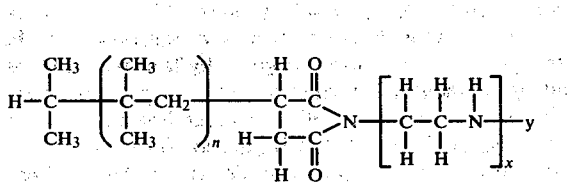

wherein n for the polyisobutylene portion varies from 10 to 60, x varies from 3 to 10, and y is selected from the group consisting of hydrogen, hydrogen-containing nitrogen radicals, hydrogen and oxygen-containing nitrogen radicals, and alkyl radicals having up to 10 carbons, alkyl radicals having up to 10 carbons which contain nitrogen, oxygen or both, and mixtures of said polyamine derivatives;

a polyisobutylene succinic anhydride derivative from the group consisting of compounds of the structure

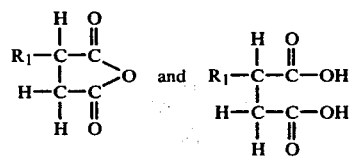

wherein $R_1$ is a $C_{10}$–$C_{60}$ hydrocarbon;
thioacids of the structure

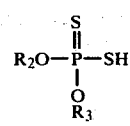

wherein $R_2$ and $R_3$ are independently selected from the group consisting of $C_4$–$C_{10}$ straight chain alkyl, $C_4$–$C_{10}$ branched chain alkyl, $C_4$–$C_{10}$ straight chain alkyl phenol, and $C_4$–$C_{10}$ branched chain alkyl phenol; and compounds of the structure

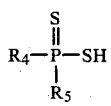

wherein $R_4$ and $R_5$ are independently selected from the group consisting of hydrogen, $C_4$-$C_{10}$ straight chain alkyl, $C_4$-$C_{10}$ branched chain alkyl, $C_4$-$C_{10}$ straight chain alkyl phenol, and $C_4$-$C_{10}$ branched chain alkyl phenol, exhibit unexpected stability and are particularly stable at high temperatures, as high as 120° C. Each additive listed above, except as noted, can be used individually in an emulsion's oil exterior phase to perform the function of both a surfactant and a strengthening agent.

The interior phase of the emulsion is aqueous. It may be acidic, basic, or neutral, depending on the specific application. It contains either one or more reagents for reacting with the compounds diffusing from the feed phase, or one or more compounds which diffuse out into the feed phase.

In this instant invention, the formulation of the liquid membrane (the exterior phase of the emulsion) is greatly simplified. In the instant invention, an additive which functions both as a surfactant and as a membrane-strengthening agent, is dissolved in a solvent. It has the advantages of both simplifying procedures for blending membrane components, as well as avoiding any undesirable reactions between the surfactant and the strengthening agent. It also has the advantage of providing much higher temperature stability than the multicomponent system. This may be due to the fact that surfactants are usually small molecules, which may become unstable at elevated temperatures for any number of reasons. The surfactants may chemically react with either components of the feed phase in which the emulsion is dispersed or with the encapsulated phase. This surfactant instability may also be caused by enhanced solubility in the feed phase and/or the encapsulated phase; or through enhanced surface activity (this means the emulsion will emulsify the feed phase). Any of the above could occur resulting in an unstable liquid membrane composition, even when a membrane-strengthening additive is present. This invention teaches to place polar groups onto a polymeric molecular chain so that the resultant molecule is both a surfactant due to the polar groups, and a membrane-strengthening additive, due to the polymeric molecular backbone.

The compounds listed below greatly enhance the stability of the emulsion. As all these compounds comprise polar groups attached to a polymeric molecular chain, it is possible that this unexpected stability derives from the fact that the polar groups give the compounds surfactant characteristics and the polymeric molecular backbone gives the compounds strengthening agent characteristics. This combination results in unexpected stability characteristics. If such is the case, there are other possible additives that may be used as both a strengthening agent and a surfactant in the exterior phase. These may include pour point depressants, sludge dispersants and viscosity-index improvers used in lube oil. Again, applicant wishes to note that he does not intend to limit the invention to any particular theory.

The exterior phase of the emulsion comprises an oil component as well as the additive component. Generally, the oil component comprises a water-immiscible solvent which may be chosen from the class consisting of hydrocarbons, halogenated hydrocarbons, ethers, higher oxygenated compounds such as alcohols, ketones, acids and esters. The oil component, of course, must be liquid at the conditions at which the instant compositions are used, must be capable of dissolving the particular additive chosen, and also must be capable, in conjunction with that particular additive, of forming a stable water in oil emulsion with the interior phase. In many applications, the interior phase is aqueous but any solvent which forms and maintains the interior phase of a stable emulsion with the selected additive-oil component exterior phase mixture may be used.

In cases where high temperatures and strong acids or bases are used, it is essential that the oil component be selected judiciously. Thus, solvents such as esters which can hydrolyze easily should not be used. Another restriction is volatility of solvents. Thus, hydrocarbons and other solvents which are volatile at 85° C. or are steam-distillable should not be used. If the instant invention is used in a water-cleaning process, solvents which leave toxic residues in water must be avoided. Further, in a process depending upon easy separation of the emulsion from the feed stream, e.g. water-cleaning process, the oil component should be selected so that the specific gravity of the formulated emulsion differs from that of the feed stream by at least about 0.025. If the specific gravity difference is less than about 0.025, the separation of the emulsion from the feed phase would be a time-consuming process and is not desirable. Other considerations would be apparent to those skilled in the art. For the reasons given above, the preferred solvent will be chosen from the following group:

Petroleum distillates having a boiling point of >200° C. Higher boiling normal paraffins which have a melting point of 70° C. or more should not be used, unless they are mixed with other solvents to lower their melting points. Paraffinic solvents lightly substituted with halogens such as chlorine or benzene rings, i.e. less than 5 mole %, may be used. Aromatic types of solvent can also be used. More preferred solvents are the petroleum distillates, such as isoparaffins having from 6 to 100 carbon atoms, most preferably from 10 to 65 carbon atoms. Examples of solvents of this type are the refined isoparaffins known as solvent neutral types, available from Exxon Chemical Company. Almost all of these are suitable in these applications such as, for example, Solvent Neutral 100, Solvent Neutral 150, Solvent Neutral 600 and the various grades in between. (The numeral refers to the viscosity in centistokes at 100° F.) The other suitable ones are Isopar M Series, also made by Exxon Chemical. Other petroleum fractions such as bright stock, Coray 90 which are petroleum lubricating oils having viscosities of 479.4 and 412.2 centistokes, respectively, at 100° F., and the like are also suitable. In many applications, it may also be desirable to use mixed solvents such as for example Solvent Neutral 100 and Solvent Neutral 600 in combination or Solvent Neutral 100 and Isopar M in combination.

The additive is selected from the group consisting of a polyamine derivative having the general formula

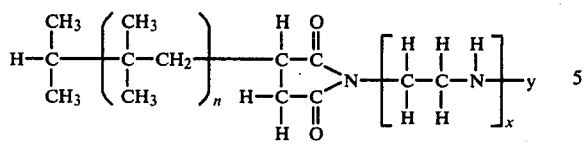

wherein n for the polyisobutylene portion varies from 10 to 60, x varies from 3 to 10, and y is selected from the group consisting of hydrogen, hydrogen-containing nitrogen radicals, hydrogen and oxygen-containing nitrogen radicals, and alkyl radicals having up to 10 carbons, alkyl radicals having up to 10 carbons which contain nitrogen, oxygen or both, and mixtures of said polyamine derivatives;

a polyisobutylene succinic anhydride derivative selected from the group consisting of compounds of the structure

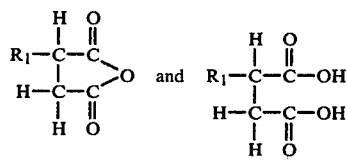

wherein $R_1$ is a $C_{10}$–$C_{60}$ hydrocarbon;
thioacids of the structure

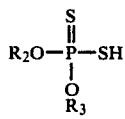

wherein $R_2$ and $R_3$ are independently selected from the group consisting of $C_4$–$C_{10}$ straight chain alkyl, $C_4$–$C_{10}$ branched chain alkyl, $C_4$–$C_{10}$ straight chain alkyl phenol, and $C_4$–$C_{10}$ branched chain alkyl phenol;
and compounds of the structure

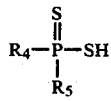

wherein $R_4$ and $R_5$ are independently selected from the group consisting of hydrogen, $C_4$–$C_{10}$ straight chain alkyl, $C_4$–$C_{10}$ branched chain alkyl, $C_4$–$C_{10}$ straight chain alkyl phenol, and $C_4$–$C_{10}$ branched chain alkyl phenol.

It was also unexpectedly discovered that an additive selected from the group consisting of a compound having the general formula:

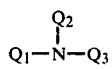

wherein $Q_1$ and $Q_2$ are independently selected from the group consisting of hydrogen, $C_1$–$C_{20}$ alkyl, $C_6$–$C_{20}$ aryl and $C_7$–$C_{20}$ alkaryl radicals and $Q_3$ is selected from the group consisting of $C_6$–$C_{30}$ alkyl, $C_6$–$C_{20}$ aryl and $C_7$–$C_{20}$ alkaryl radicals; and

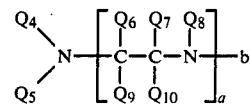

wherein $Q_4$, $Q_5$, $Q_6$, $Q_7$, $Q_8$, $Q_9$, $Q_{10}$ and b are independently selected from the group consisting of hydrogen, $C_1$–$C_{20}$ alkyl, $C_6$–$C_{20}$ aryl, $C_7$ and $C_{20}$ alkaryl radicals and substituted derivatives thereof, and a is an integer of from 1 to 100; and mixtures thereof; also exhibits very high stability just as the first group of additives, i.e. the polyamine derivatives. The polyamine derivatives having the general formula:

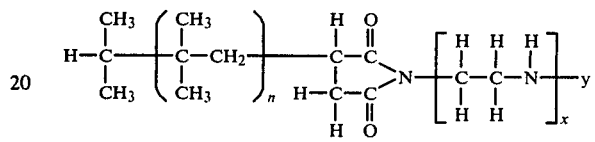

wherein n for the polyisobutylene portion varies from 10 to 60, x varies from 3 to 10, and y is selected from the group consisting of hydrogen, hydrogen-containing nitrogen radicals, hydrogen and oxygen-containing nitrogen radicals, and alkyl radicals having up to 10 carbons, alkyl radicals having up to 10 carbons which contain nitrogen, oxygen or both, and mixtures of said polyamine derivatives. These polyamine derivatives may comprise from about 0.001 wt.% to about 50 wt.% of the exterior phase of the emulsion.

It has been unexpectedly discovered that each of the above-listed additives can function as both a surfactant and a strengthening agent in an emulsion, when added to the oil exterior phase. An emulsion formulation with any one of the above additives exhibits enhanced stability, particularly at high temperatures, e.g. up to 120° C. By remaining stable, it is meant that these emulsion compositions will remain substantially intact so that membrane breakage will be minimal. It should also be noted that the stability of the emulsion containing the above additives in the exterior phase will be adversely affected at higher temperatures if there is a composition in the feed phase or the encapsulated phase that will chemically attack the additive at high temperatures. Thus, the additives of this instant invention should not be used if there is a composition in either the feed phase or the encapsulated phase that will react with them chemically at elevated temperatures. For example, $H_2S$ in waste water will react strongly with ENJ- 3029 at 80° C., thereby resulting in emulsion disintegration.

The above-listed additives are compatible with most other surfactants, strengthening agents and liquid ion exchanges of the prior art. Thus, although an emulsion formulation utilizing one of the above additives exhibits enhanced stability characteristics, the skilled artisan will not be precluded from adding other compatible surfactants, strengthening agents or liquid ion exchanges to the emulsion if the need arises.

The additive component will comprise from about 0.001 wt.% to about 50 wt.% of the exterior phase, preferably from about 0.01 wt.% to about 30 wt.% of the exterior phase, most preferably, from about 0.1 wt.% to about 10 wt.% of the exterior phase.

The interior phase, as noted above, may be any solvent which forms and maintains the interior phase of a stable emulsion with the additive-oil component exterior phase mixture selected. The interior phase is immiscible with the exterior phase. Most conveniently, the interior phase may be aqueous.

The selection of the component or components of the interior phase depends primarily on their intended use.

The emulsions of the instant invention are useful wherever a stable water-in-oil type emulsion is needed, especially at high temperatures. For example, the liquid membrane formulations of the instant invention are useful in removing compositions dissolved in the aqueous feed phase, i.e. the outer phase, by trapping them in the interior phase of the emulsion. In this trap embodiment, the exterior phase is permeable to said dissolved compositions and the interior phase comprises a reagent capable of converting said dissolved composition into a nonpermeable form.

U.S. Pat. No. 3,779,907 teaches a process for the removal of dissolved species from an aqueous solution by the utilization of certain water-in-oil emulsion formulations. Identically, the interior phase comprises a reactant capable of converting dissolved species (that permeated through the emulsion) into a nonpermeable form. The emulsions of the instant invention may be utilized in place of the emulsion formulations of U.S. Pat. No. 3,779,907 to perform the same removal of dissolved species. Therefore, U.S. Pat. No. 3,779,907 is hereby incorporated by reference. This patent discloses the classes of dissolved species that may be removed by the emulsions of the instant invention; the choice and concentration of reagent for the interior phase that are appropriate for the removal of a particular species, i.e. that will convert the dissolved species into a nonpermeable form; and the choice of solubilizing additives, e.g. liquid ion exchange compounds, if such is deemed necessary.

In another embodiment, the liquid membrane formulations of the instant invention may be used as slow-release mechanisms. In this embodiment, the interior phase comprises the composition to be released from the emulsion. The compositions utilized in the slow-release embodiment are only slightly soluble in the exterior phase of the emulsion whereby said composition permeates through said exterior phase into the aqueous outer phase over a period of time. The speed of this release depends upon how soluble the composition of the interior phase (to be released) is in the exterior phase of the emulsion. The more soluble this composition is in the exterior phase, the quicker the composition will permeate out of the emulsion. The skilled artisan will be able to select the components of the exterior phase required for a certain type of release for a given chemical composition present in the interior phase. This selection is based upon the solubility of that given composition in a specific exterior phase.

This slow-release embodiment can be used for a wide range of applications. The compositions that may be used in this slow-release embodiment include insecticides, caustic or acidic compositions for the control of pH, medicinal compositions, fertilizers, or reagents for initiating certain chemical reactions.

The interior phase of the instant invention will comprise from about 25 wt.% to about 90 wt.% of the total emulsion, preferably from about 33 wt.% to about 80 wt.% of the total emulsion.

The emulsions of the instant invention may be operated under any pressure at which the fluidity of the various phases will be maintained. For convenience, ambient pressures are used in the examples. These emulsions may be operated at any temperature from about −20° C. to about 120° C., preferably from about 0° C. to about 100° C., and most preferably from about 25° C. to about 85° C. The only limitation to the upper temperature limit is that it must be less than the boiling point of any of the components of the emulsion. This may occur, for instance, where the interior phase of the emulsion is aqueous which does not contain a sufficient amount of solute to raise the temperature of the interior phase to the desired level, e.g. 120° C.

The following examples are submitted to illustrate and not limit the invention.

In Examples 1 to 3, the feed phase was a simulated waste water phase, containing 1000 ppm of phenol dissolved in water. The membrane phase was composed of 2% Span-80 in Example 1, 2% Span-80 and 2% ENJ-3029 in Example 2, and 3% ENJ-3029 in Example 3. The encapsulated reagent phase was 0.5% NaOH aqueous solution. The procedure of making the emulsion was the same for all three experiments. The surfactant, or membrane-strengthening agent, or both, were dissolved in S100N. The caustic solution to be encapsulated was then poured into the oil phase under agitation to form an emulsion. The weight ratio of the caustic solution to the oil phase was 1:2. The emulsion was mixed gently with the feed at a weight ratio of 1:1. The mixing was stopped from time to time for sampling the feed phase. Examples 1–3 were run at 25° C. The feed phase samples were analyzed for phenol concentration. The results appear in Table I.

The comparison of the results of phenol removal from Examples 1–3 shows that using a surfactant, such as Span-80, alone cannot make a stable and effective liquid membrane emulsion for the removal of phenol from its aqueous solution. The use of Span-80 in conjunction with a membrane-strengthening agent, such as ENJ-3029 did result in a stable emulsion. An emulsion substantially equal in stability to that of Example 2 was also achieved by using ENJ-3029 alone as both a surfactant and a membrane-strengthening agent. Example 3 thus demonstrates that there is no need to have both a separate surfactant and strengthening agent component to make a stable emulsion. A stable emulsion was achieved by an additive that performed both functions, here ENJ-3029.

The increased effective removal rates exhibited in Examples 2 and 3 over the removal rate of Example 1 was due to the higher stability of the emulsion formulations of Examples 2 and 3. This higher stability minimized the rupture of the emulsions in Example 1. The minimization of rupture by the emulsion formulations of Examples 2 and 3 resulted in the higher effective removal rates of phenol by Examples 2 and 3.

It should be presently noted that ENJ-3029 is a mixture of compounds of the following structure:

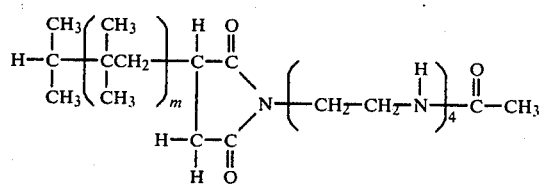

wherein m is an integer of about 40, giving said polyamine derivative a molecular weight of about 2,000, suspended in a mineral oil having the viscosity of 20 centipoise. It should be noted that ENJ-3029 is no longer available from the Exxon Chemical Company.

EXAMPLES 1 TO 4

TABLE I

| Sampling Time (Min.) | Phenol Concentration in Feed (ppm) | | | |
|---|---|---|---|---|
| | Example 1 | Example 2 | Example 3 | Example 4 |
| 0 | 950 | 950 | 950 | 1050 |
| 2 | 652 | 66 | 90 | 61 |
| 5 | 288 | 9 | 15 | 4 |
| 18 | 41 | 5 | 6 | 3 |
| 38 | 44 | 6 | 3 | — |
| 53 | 33 | 6 | 3 | — |
| 68 | 49 | 6 | 2 | — |
| 83 | 59 | — | — | |
| 113 | 91 | — | — | |

In Example 4, the membrane phase and the feed phase were identical to that of Example 3. The encapsulated interior phase was increased to 30% NaOH solution. The weight ratios of the caustic solution to the oil phase and emulsion to feed were the same as used in the previous examples. The temperature of this run was also 25° C. The results appear on Table I. The higher removal rate of the phenol was achieved by the low rupture rate of the emulsion formulation using ENJ-3029. The formulation remained stable even though a much higher concentration of caustic solution (30% NaOH in Example 4 versus 0.5% in Example 1) was used.

EXAMPLES 5 AND 6

In these examples, the membrane phase and the encapsulated phase were the same as used in the previous examples—the membrane phase in Example 5 was the same as used in Example 1 whereas that in Example 6 was the same as used in Example 3. The procedures of making the emulsion were the same as those used in the previous examples.

After the emulsions were made, they were placed in a stainless bomb and heated to 110° C. for one hour. The emulsions were then allowed to cool down to room temperature for observation. We found that about ⅓ of the emulsion in Example 5 had decomposed into oil and caustic layers. The emulsion made in Example 6, however, showed no phase separation and remained stable. Thus, the formulation of Example 6 using ENJ-3029 alone, acting as both the surfactant and strengthening agent, remained stable at higher temperatures.

EXAMPLE 7

In Example 7, the feed phase was a simulated mine leaching solution, containing 448 ppm of copper dissolved in sulfuric acid solution (pH=2.5) as copper sulfate. The membrane phase was composed of 1% ECA 4360 distributed by Exxon Chemical Company, whose structure is similar to that of ENJ-3029 except y is a hydrogen-containing nitrogen radical, 5% LiX 64N, an oxime-type copper complexing agent made by General Mills, 11% S100N, and 83% isopar M, an isoparaffinic solvent. The encapsulated reagent phase was an aqueous solution of 14% $H_2SO_4$ and 13% $CuSO_4.5H_2O$. $CuSO_4$ was included in the reagent phase to simulate a used emulsion. The procedure of making the emulsion was the same as the previous examples. The weight ratio of the encapsulated phase to the oil phase was 1:1. The emulsion was mixed gently with the feed at a weight ratio of 1:9. The mixing was stopped from time to time for sampling the feed phase. The feed samples were analyzed for copper concentration. The results show extremely good separation of copper—in 12 minutes the copper concentration in the feed dropped to values beyond the detection capability of standard colorimetric analysis of the copper concentration.

TABLE 2

| Sampling Time (min.) | Copper Concentration in Feed (ppm) |
|---|---|
| 0 | 448 |
| 2 | 28 |
| 7 | 20 |
| 12 | 10 |

What is claimed is:

1. An emulsion stable from about −20° C. to about 120° C., but less than the boiling point of any of the components of said emulsion, which comprises an interior phase surrounded by an exterior phase, said exterior phase being water-immiscible and comprising an oil component containing as the sole surfactant and strengthening agent an additive selected from the group consisting of a polyamine derivative having the general formula:

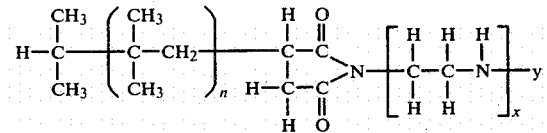

wherein n for the polyisobutylene portion varies from 10 to 60, x varies from 3 to 10, and y is selected from the group consisting of hydrogen, hydrogen-containing nitrogen radicals, hydrogen and oxygen-containing nitrogen radicals, and alkyl radicals having up to 10 carbons, alkyl radicals having up to 10 carbons which contain nitrogen, oxygen or both, and mixtures of said polyamine derivatives; wherein said additive comprises from about 0.001 wt.% to about 50 wt.% of said exterior phase, said interior phase being immiscible with the interior phase, said interior phase comprising from about 25 wt.% to about 90 wt.% of the total emulsion.

2. The emulsion of claim 1 wherein said emulsion is stable from about 0° C. to about 100° C. wherein said additive comprises from about 0.1 to about 30 wt.% of said exterior phase.

3. The emulsion of claim 2 wherein said additive comprises from about 0.1 wt.% to about 10 wt.% of said exterior phase.

4. The emulsion of claim 2 or 3 wherein said interior phase comprises from about 33 wt.% to 80 wt.% of said total emulsion.

5. The emulsion of claim 2 or 3 wherein said emulsion is stable from about 25° C. to about 85° C.

6. The emulsion of claim 3 wherein said interior phase further comprises a reactant capable of converting a permeable species into a nonpermeable form.

* * * * *